United States Patent
Kim et al.

(10) Patent No.: US 11,790,252 B2
(45) Date of Patent: Oct. 17, 2023

(54) APPARATUS AND METHOD FOR PREPROCESSING SECURITY LOG

(71) Applicant: SAMSUNG SDS CO., LTD., Seoul (KR)

(72) Inventors: Jang-Ho Kim, Seoul (KR); Young-Min Cho, Seoul (KR); Jung-Bae Jun, Seoul (KR); Seong-Hyeok Seo, Seoul (KR); Jang-Mi Shin, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 640 days.

(21) Appl. No.: 16/665,663

(22) Filed: Oct. 28, 2019

(65) Prior Publication Data
US 2020/0134487 A1    Apr. 30, 2020

(30) Foreign Application Priority Data
Oct. 30, 2018    (KR) .................... 10-2018-0130743

(51) Int. Cl.
*G06N 5/04* (2023.01)
*G06N 20/00* (2019.01)
*G06F 16/25* (2019.01)

(52) U.S. Cl.
CPC .............. *G06N 5/04* (2013.01); *G06F 16/258* (2019.01); *G06N 20/00* (2019.01)

(58) Field of Classification Search
CPC ........ G06N 5/04; G06N 20/00; G06F 16/258; G06F 16/166; G06F 16/1794
USPC .................... 707/602, 755, 736, 802, 811
See application file for complete search history.

(56) References Cited

U.S. PATENT DOCUMENTS

| | | | |
|---|---|---|---|
| 9,080,894 B2 * | 7/2015 | Spanier | G06F 3/0619 |
| 2002/0144146 A1 * | 10/2002 | Lortz | A63F 13/75 |
| | | | 726/25 |
| 2002/0178253 A1 * | 11/2002 | Sedlack | H04L 41/0226 |
| | | | 709/224 |
| 2008/0235355 A1 * | 9/2008 | Spanier | G06F 16/27 |
| | | | 709/219 |
| 2014/0211931 A1 * | 7/2014 | Wendt | H04M 3/5175 |
| | | | 379/265.03 |
| 2016/0267142 A1 * | 9/2016 | Cafarella | G06F 16/24568 |

(Continued)

FOREIGN PATENT DOCUMENTS

KR    10-2017-0067118 A    6/2017

OTHER PUBLICATIONS

Office action dated Apr. 26, 2021 from Korean Patent Office in a counterpart Korean Patent Application No. 10-2018-0130743(all the cited references are listed in this IDS.) (English translation is also submitted herewith.).

(Continued)

*Primary Examiner* — Cam Linh T Nguyen
(74) *Attorney, Agent, or Firm* — The PL Law Group, PLLC

(57) ABSTRACT

According to one embodiment, An apparatus for preprocessing a security log includes a field divider configured to divide a character string of a security log into a plurality of fields on the basis of a structure of the security log, an ASCII code converter configured to convert a character string included in each of the plurality of divided fields into ASCII codes, and a vector data generator configured to generate vector data for each of the plurality of divided fields using the converted ASCII codes.

4 Claims, 7 Drawing Sheets

(56) References Cited

U.S. PATENT DOCUMENTS

2017/0126724 A1\* 5/2017 Zhong .................. G06F 21/554
2020/0184072 A1\* 6/2020 Ikeda ................... G06F 21/566

OTHER PUBLICATIONS

Hung Le et al., "URLNet: Learning a URL Representation with Deep Learning for Malicious URL Detection", In Proceedings of ACM Conference, Washington, DC, USA, Jul. 2017, (arXiv:1802.03162v2 [cs.CR] Mar. 2, 2018).

Xiang Zhang et al., "Character-level Convolutional Networks for Text Classification", arXiv:1509.01626v3 [cs.LG], 2016.

\* cited by examiner

FIG. 2

```
urlDataStructure = {
    'protocolDict':{
        'protocol':str(),
        'protocolLen':int(),
        'protocolVec':tuple()
    },
    'domainDict':{
        'domain':str(),
        'domainLen':int(),
        'domainVec':tuple()
    },
    'pathDict':{
        'path':str(),
        'pathLen':int(),
        'pathVec':tuple(),
        'splitPathDictList':[
            {
                'splitPath': str(),
                'splitPathLen': int(),
                'splitPathVec':tuple(),
            }
        ]
    },
    'queryDict':{
        'query':str(),
        'queryLen':str(),
        'queryVec':tuple(),
        'queryDataDictList':[
            {
                'keyDict':{
                    'key':str(),
                    'keyLen':int(),
                    'keyVec':tuple()
                },
                'valDict':{
                    'val':str(),
                    'valLen':int(),
                    'valVec':tuple()
                }
            }
        ]
    }
}
```

| | Protocol | | | | | | | L | | Domain | | | | | | | | | | L |
|---|---|---|---|---|---|---|---|---|---|---|---|---|---|---|---|---|---|---|---|---|
| h | t | t | p | : | / | / | | | s | a | m | s | u | n | g | . | c | o | m | |
| 104 | 116 | 116 | 112 | 58 | 47 | 47 | 0 | 7 | 115 | 97 | 109 | 115 | 117 | 110 | 103 | 46 | 99 | 111 | 109 | 11 |

8 dimensions — tuple(104,116,116,112,58,47,47,0,7)

20 dimensions — tuple(115,97,109,115,117,110,103,46,99,111,109,0,0,0,0,0,0,0,0,0,11)

APPARATUS AND METHOD FOR PREPROCESSING SECURITY LOG

CROSS-REFERENCE TO RELATED APPLICATION(S)

This application claims the benefit under 35 USC § 119(a) of Korean Patent Application No. 10-2018-0130743, filed on Oct. 30, 2018, in the Korean Intellectual Property Office, the entire disclosure of which is incorporated herein by reference for all purposes.

BACKGROUND

1. Field

The following description relates to a technology for preprocessing a security log.

2. Description of Related Art

A security system records a security log in text format when security equipment is used. At this time, in order to defend against security threats it is important to accurately detect an attack script by analyzing the security logs. In this regard, recently, security logs are analyzed using a machine learning-based prediction model to predict an intrusion from the outside. When security logs are analyzed using a machine learning-based prediction model, however, a process of preprocessing the security logs is required.

Conventional preprocessing models to preprocess security logs may include Word2Vec, Hashing Vectorization, and the like. However, since the conventional technologies analyze relative positions of words in context included in a security log, information included in the security log may be lost or distorted when the security log is preprocessed using the conventional preprocessing model.

For this reason, there is a demand for a method which can preprocess a security log such that information included in the security log is not lost and distorted and a machine learning-based prediction model can be optimized for analysis of the security log.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus and method for preprocessing a security log.

In one general aspect, there is provided an apparatus for preprocessing a security log including a field divider configured to divide a character string of a security log into a plurality of fields on the basis of a structure of the security log; an ASCII code converter configured to convert a character string included in each of the plurality of divided fields into ASCII codes; and a vector data generator configured to generate vector data for each of the plurality of divided fields using the converted ASCII codes.

The ASCII code converter may convert a predetermined character among a plurality of characters included in the character string into a weighted ASCII code.

The vector data may include the converted ASCII codes and a length of the character string included in each of the plurality of divided fields.

The dimension of the vector data may be determined based on a set maximum length of a character string for each of the plurality of divided fields.

When a specific element among a plurality of elements included in the vector data corresponds neither to the converted ASCII codes nor to the length of the character string included in each of the plurality of divided fields, the vector data generator may set a value of the specific element to be zero on the basis of the determined dimension.

In another general aspect, there is provided a method of preprocessing a security log including dividing a character string of a security log into a plurality of fields on the basis of a structure of the security log; converting a character string included in each of the plurality of divided fields into ASCII codes; and generating vector data for each of the plurality of divided fields using the converted ASCII codes.

The converting of the character string may include converting a predetermined character among a plurality of characters included in the character string into a weighted ASCII code.

The vector data may include the converted ASCII codes and a length of the character string included in each of the plurality of divided fields.

The dimension of the vector data may be determined based on a set maximum length of a character string for each of the plurality of divided fields.

The generating of the vector data may include, when a specific element among a plurality of elements included in the vector data corresponds neither to the converted ASCII codes nor to the length of the character string included in each of the plurality of divided fields, setting a value of the specific element to be zero on the basis of the determined dimension.

Other features and aspects will be apparent from the following detailed description, the drawings, and the claims.

BRIEF DESCRIPTION OF THE DRAWINGS

FIG. 2 is a diagram illustrating an example in which a structure is expressed in a programming language.

FIG. 5 is a diagram for describing an example in which a character string is converted into ASCII codes according to one embodiment.

Figure 1:
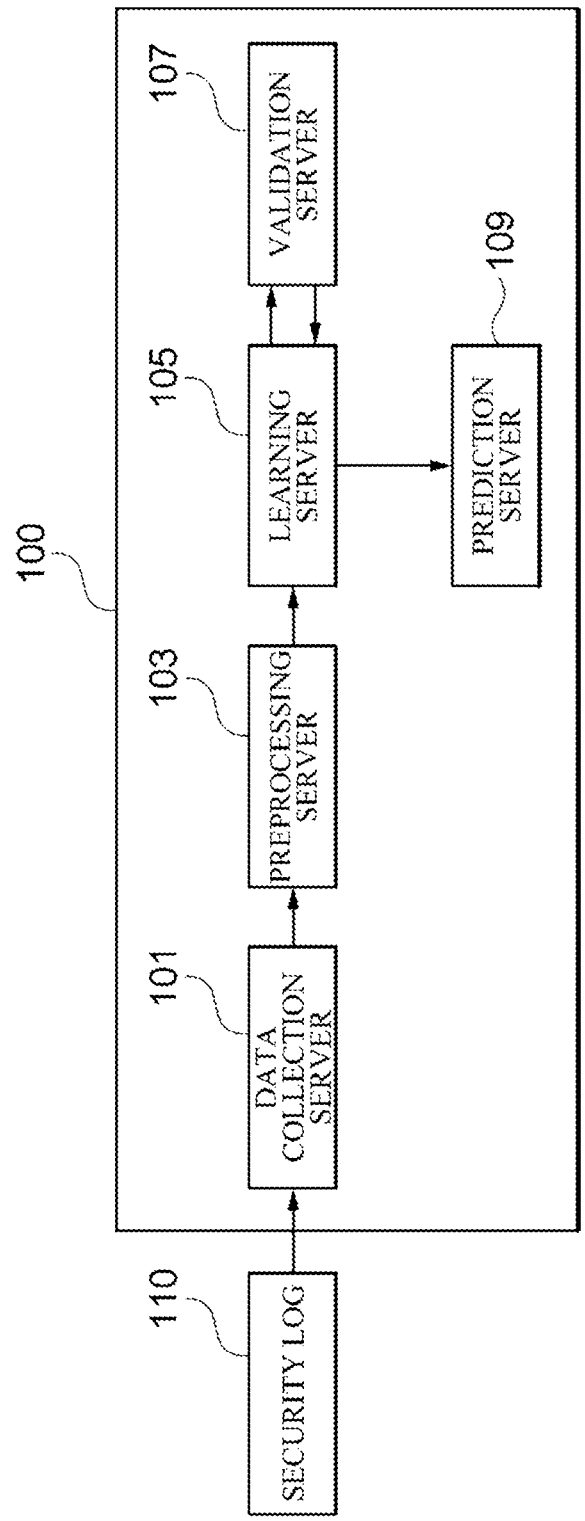
FIG. 1 is a diagram illustrating a configuration of a security log analysis system according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a diagram illustrating a configuration of a security log analysis system 100 according to one embodiment.

The security log analysis system 100 may be configured with one or more servers for analyzing a security log 110 of the security system to detect an intrusion from the outside and to defend against the intrusion. In this case, the security log 110 may mean log in text form recorded at the time of using security equipment. For example, the security log 110 may include an intrusion detection system (IDS) event log, a web log, a firewall log, an advanced persistent threat (APT) log, and the like. Also, the security log 110 may be in the form of, for example, uniform resource locator (URL).

Referring to FIG. 1, the security log analysis system 100 may include a data collection server 101, a preprocessing server 103, a learning server 105, a validation server 107, and a prediction server 109.

The data collection server 101 may collect a security log 110 to be analyzed. Also, the data collection server 101 may design a structure for storing a preprocessed security log. In this case, the structure may include information on a security log preprocessed according to a method described below, for example, a character string included in each of the plurality of fields, a length of the character string included in each of the plurality of fields, vector data for each of the plurality of fields, and the like.

FIG. 2 is a diagram illustrating an example in which a structure 200 is expressed in a programming language.

Referring to FIG. 2, when it is assumed that a character string of a security log is divided into a protocol field 210, a domain field 220, a path field 230, and a query string field 240, the structure 200 may include information on each of the fields 210, 220, 230, and 240. For example, the structure 200 may include a character string included in the protocol field 210, the length of the character string included in the protocol field 210, and vector data for the protocol field 210 as the information on the protocol field 210.

In the above-described example, the structure is designed to include the character string included in the field, the length of the character string included in the field, and the vector data for the field, but is not necessarily limited thereto and may be designed in various forms according to an embodiment.

Referring back to FIG. 1, the preprocessing server 103 may preprocess the collected security log 110 into a form suitable to be used as learning data in a prediction model. In this case, the prediction model may be a machine learning-based model that detects an attack script from a specific security log on the basis of learning data including a preprocessed security log. For example, the prediction model may include random forest, K-means clustering, and the like.

The learning server 105 may train the prediction model based on a predetermined algorithm using the preprocessed security log as learning data. Also, the learning server 105 may re-train the prediction model on the basis of a verification result of the prediction model received from the validation server 107.

The validation server 107 may verify the trained prediction model using a validation set. In this case, the validation server 107 may evaluate the performance of the prediction model through the verification of the prediction model.

The prediction server 109 may detect an attack script from a specific security log using the prediction model.

Figure 3:
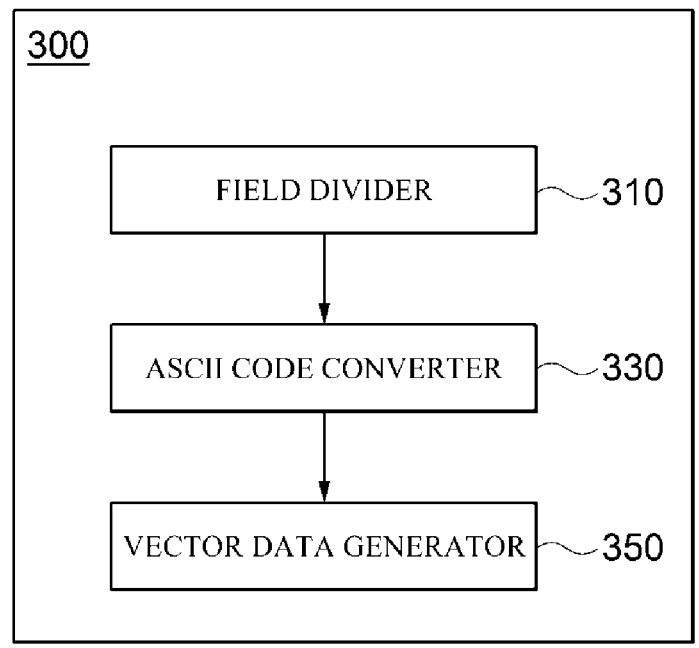
FIG. 3 is a diagram illustrating a configuration of an apparatus for preprocessing a security log according to one embodiment.

FIG. 3 is a diagram illustrating a configuration of an apparatus for preprocessing a security log according to one embodiment.

The apparatus 300 shown in FIG. 3 for preprocessing a security log may be implemented as, for example, one element of the preprocessing server 103 shown in FIG. 1.

Referring to FIG. 3, the apparatus 300 for preprocessing a security log may include a field divider 310, an ASCII code converter 330, and a vector data generator 350.

The field divider 310 divides a character string of a security log into a plurality of fields on the basis of a structure of the security log.

The structure of the security log may be information that a user may obtain by analyzing in advance the general structure of the security log. In this case, the structure of the security log may consist of a plurality of fields. The fields are classified according to the meaning of characters included in the security log. For example, the fields may include a protocol field, a domain field, a path field, a query string field, and the like.

Figure 4:
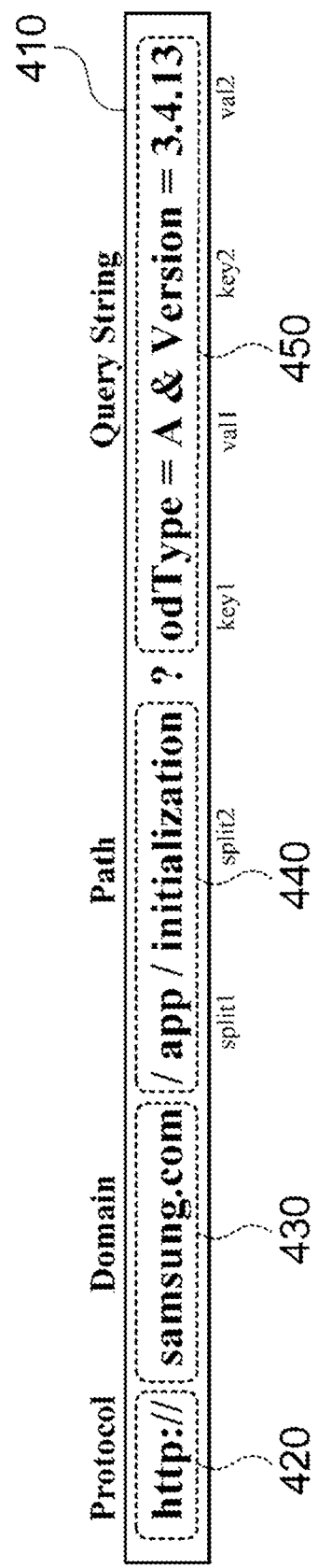
FIG. 4 is a diagram for describing an example in which a character string of a security log is divided into a plurality of fields according to one embodiment.

FIG. 4 is a diagram for describing an example in which a character string of a security log is divided into a plurality of fields according to one embodiment.

Referring to FIG. 4, the field divider 310 may divide a character string of a security log 410 into a protocol field 420, a domain field 430, a path field 440, and a query string field 450 on the basis of a structure of the security log 410 that consists of protocol, domain, path, and query string. In addition, the field divider 310 may further divide the divided field into sub-fields on the basis of a structure in which a character string included in the divided field is repeated. For example, among the plurality of divided fields, the path field 440 may be further divided into split1 field and split2 field, and the query string field 450 may be further divided into key1 field, value1 field, key2 field, and value 2 field.

Referring back to FIG. 3, the ASCII code converter 330 may convert the character string included in each of the plurality of divided fields into ASCII codes.

FIG. 5 is a diagram for describing an example in which a character string is converted into ASCII codes according to one embodiment.

Referring to FIG. 5, assuming that a character string 520 of "http://" is included in a protocol field 510, the ASCII code converter 330 may convert each character in the character string 520 included in the protocol field 510 into ASCII codes 530.

In addition, assuming that a character string 550 of "samsung.com" is included in a domain field 540, the ASCII code converter 330 may convert each character in the character string 550 included in the domain field 540 into ASCII codes 560.

Referring back to FIG. 3, according to one embodiment, the ASCII code converter 330 may convert a predetermined character among the plurality of characters included in the character string into a weighted ASCII code.

In this case, the predetermined character may mean a character generally used in an attach script included in a security log. For example, the predetermined character may be a special character, such as "@," "#," "$," "%," "^".

The vector data generator 350 generates vector data for each of the plurality of fields using the converted ASCII codes. In this case, the vector data may be data that corresponds to the security log. In addition, the vector data may be learning data to be input to a prediction model.

According to one embodiment, the vector data may include the converted ASCII codes and a length of the character string included in each of the plurality of divided fields. In this case, the converted ASCII codes and the length of the character string included in each of the plurality of divided fields may be elements of the vector data.

Referring back to FIG. 5, a length 580 of the character string 520 included in the protocol field 510 is 7, and thus the vector data generator 350 may generate vector data 570 that includes the ASCII codes 530 converted from the character string 520 included in the protocol field 510 and the length 580 of the character string 520. At this time, the vector data generator 350 may generate the vector data 570 by placing the ASCII codes 530 at the foremost position and placing the length 580 of the character string 520 at the rearmost position.

Meanwhile, in the example described above, the vector data generator 350 places the converted ASCII codes at the foremost position and places the length of the character string at the rearmost position to generate the vector data, but is not limited thereto, such that the position of the converted ASCII codes and the position of the length of the character string may be set variously in the vector data.

Referring back to FIG. 3, according to one embodiment, the dimension of the vector data may be determined based on a set maximum length of the character string of each of the plurality of divided fields.

Specifically, a value obtained by adding 1 to the set maximum length of the character string for each of the plurality of fields may be determined to be the dimension of the vector data.

Referring to FIG. 5, assuming that the set length of the character string for the protocol field 510 is 8, the dimension of the vector data 570 for the protocol field 510 may be determined to be the nine dimensions.

Meanwhile, in the example described above, the value obtained by adding 1 to the set maximum length of the character string for each of the plurality of fields is determined to be the dimension of the vector data, but is not limited thereto, and the dimension of the vector data may be determined to be a variety of dimensions.

Referring back to FIG. 3, according to one embodiment, when a specific element among a plurality of elements included in the vector data corresponds neither to the converted ASCII codes nor to the length of the character string included in each of the plurality of fields, the vector data generator 350 may set a value of the specific element to be zero on the basis of the determined dimension of the vector data.

Referring back to FIG. 5, assuming that the set maximum length of the character string for the protocol field 510 is 8, the dimension of the vector data 570 for the protocol field 510 is determined to be 9 dimensions, and thus there may be a specific element 590 that corresponds neither to the converted ASCII codes 530 nor to the length 580 of the character string, among the plurality of elements included in the vector data 570. In this case, the vector data generator 350 may generate the vector data 570 by setting a value of the specific element 590 to be zero.

Figure 6:
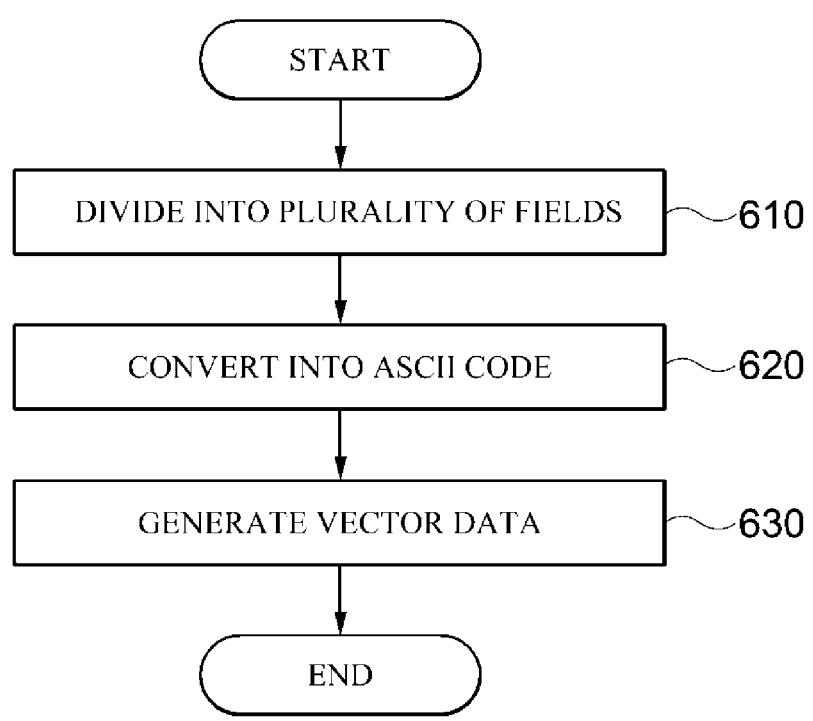
FIG. 6 is a flowchart illustrating a method of preprocessing a security log according to one embodiment.

FIG. 6 is a flowchart illustrating a method of preprocessing a security log according to one embodiment.

The method illustrated in FIG. 6 may be performed by the apparatus 300 shown in FIG. 3 for preprocessing a security log.

Referring to FIG. 6, the apparatus 300 for preprocessing a security log divides a character string of a security log into a plurality of fields on the basis of a structure of the security log (610).

Then, the apparatus 300 for preprocessing a security log converts a character string included in each of the plurality of divided fields into ASCII codes (620).

In this case, the apparatus 300 for preprocessing a security log may convert a predetermined character among a plurality of characters included in the character string into a weighted ASCII code.

Then, the apparatus 300 for preprocessing a security log generates vector data for each of the plurality of fields using the converted ASCII codes (630).

In this case, when a specific element among a plurality of elements included in the vector data corresponds neither to the converted ASCII codes nor to the length of the character string included in each of the plurality of fields, the apparatus 300 for preprocessing a security log may set a value of the specific element to be zero on the basis of the determined dimension.

Meanwhile, in the flowchart illustrated in FIG. 6, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

Figure 7:
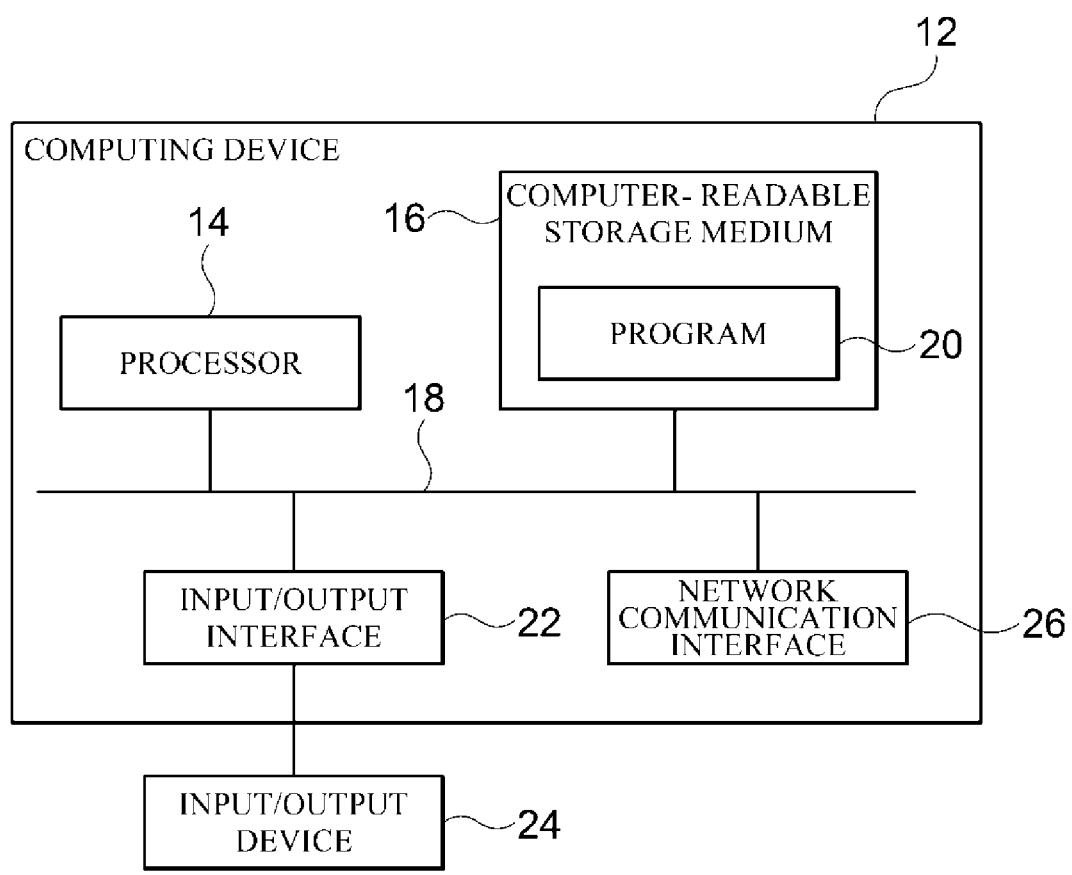
FIG. 7 is a block diagram for describing a computing environment including a computing device suitable to be used in exemplary embodiments.

FIG. 7 is a block diagram for describing a computing environment including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be one or more components included in the apparatus 300 for preprocessing a security log, such as the field divider 310, the ASCII code converter 330, and the vector data generator 350 that are shown in FIG. 3.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to an exemplary embodiment.

The computer-readable storage medium 16 is configured to store computer executable commands and program codes, program data and/or information in other suitable forms. The program 20 stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

According to the disclosed embodiments, by preprocessing a security log using ASCII codes, it is possible to convert the security log into vector data without losing or distorting information included in the security log.

In addition, according to the disclosed embodiment, by converting a security log into vector data, it is possible to improve the performance of a machine learning-based prediction model that analyzes the security log.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for preprocessing a security log, comprising at least one hardware processor configured to implement:
   a field divider configured to divide a character string of a security log into a plurality of fields on the basis of a structure of the security log;
   an ASCII code converter configured to convert a character string included in each of the plurality of divided fields into ASCII codes;
   a vector data generator configured to generate vector data for each of the plurality of divided fields using the converted ASCII codes, the vector data comprising the converted ASCII codes and a length of the character string included in each of the plurality of divided fields; and
   a learning server configured to train a machine learning-based prediction model to predict an intrusion using the vector data,
   wherein the ASCII code converter is configured to convert a predetermined character among a plurality of characters included in the character string into a weighted ASCII code, wherein the predetermined character is a character used in an attack script included in the security log,
   wherein a dimension of the vector data is determined based on a set maximum length of a character string for each of the plurality of divided fields,
   wherein a value obtained by adding 1 to the set maximum length is determined to be the dimension of the vector data.

2. The apparatus of claim 1, wherein when a specific element among a plurality of elements included in the vector data corresponds neither to the converted ASCII codes nor to the length of the character string included in each of the plurality of divided fields, the vector data generator is further configured to set a value of the specific element to be zero on the basis of the determined dimension.

3. A method of preprocessing a security log, comprising:
   dividing a character string of a security log into a plurality of fields on the basis of a structure of the security log;
   converting a character string included in each of the plurality of divided fields into ASCII codes; and
   generating vector data for each of the plurality of divided fields using the converted ASCII codes, the vector data comprising the converted ASCII codes and a length of the character string included in each of the plurality of divided fields; and
   training a machine learning-based prediction model to predict an intrusion using the vector data,
   wherein the converting of the character string comprises converting a predetermined character among a plurality of characters included in the character string into a weighted ASCII code, wherein the predetermined character is a character used in an attack script included in the security log,
   wherein a dimension of the vector data is determined based on a set maximum length of a character string for each of the plurality of divided fields,
   wherein a value obtained by adding 1 to the set maximum length be determined to be the dimension of the vector data.

4. The method of claim 3, wherein the generating of the vector data comprises, when a specific element among a plurality of elements included in the vector data corresponds neither to the converted ASCII codes nor to the length of the character string included in each of the plurality of divided fields, setting a value of the specific element to be zero on the basis of the determined dimension.

* * * * *